United States Patent [19]

Inoue

[11] 4,364,812
[45] Dec. 21, 1982

[54] GUIDE BODY MEMBER FOR A WIRE ELECTRODE IN A WIRE-CUTTING ELECTROEROSION MACHINE

[75] Inventor: Kiyoshi Inoue, Tokyo, Japan

[73] Assignee: Inoue-Japax Research Incorporated, Yokohama, Japan

[21] Appl. No.: 229,549

[22] Filed: Jan. 28, 1981

[30] Foreign Application Priority Data

Jan. 29, 1980 [JP] Japan .................. 55-9740[U]

[51] Int. Cl.³ .................. B23P 1/12; B23K 9/16
[52] U.S. Cl. .................. 204/224 M; 204/225; 204/297 R; 219/69 W
[58] Field of Search .......... 204/224 M, 225, 297 R, 204/206; 219/69 W

[56] References Cited

U.S. PATENT DOCUMENTS

| 4,123,645 | 10/1978 | Shichida et al. | 219/69 W |
| 4,205,212 | 5/1980 | Ullmann et al. | 219/69 W |
| 4,205,213 | 5/1980 | Inoue | 219/69 W |
| 4,263,116 | 4/1981 | Inoue | 204/224 M |

FOREIGN PATENT DOCUMENTS 1474960 5/1977 United Kingdom .
1475725 6/1977 United Kingdom .

Primary Examiner—Donald R. Valentine
Attorney, Agent, or Firm—Karl F. Ross

[57] ABSTRACT

A guide body for constituting at least one of a pair of guide members for a continuous wire electrode in a wire-cutting electroerosion machine comprises a first segment formed with a continuous and elongated wire-receiving groove having a first portion which is rectilinear and proximate to the wire-cutting zone and a second portion which is arcuate and remote from the wire-cutting zone, the groove being V-shaped in cross-section continuously over the first rectilinear and second arcuate portions and thereby defining a pair of continuous and elongated wire-bearing surfaces joining with an angle to form the V-shape in cross-section; and a second segment coupled to the first segment for holding the wire electrode traveling in the first portion of the groove in a bearing contact with the said surfaces in the first segment.

5 Claims, 4 Drawing Figures

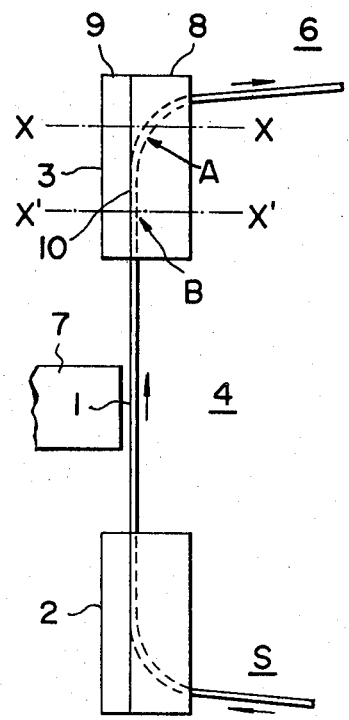
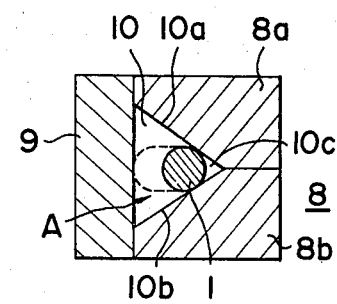
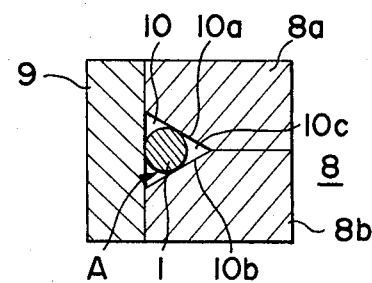
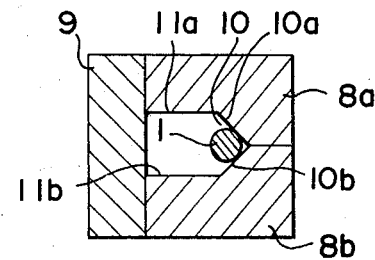

GUIDE BODY MEMBER FOR A WIRE ELECTRODE IN A WIRE-CUTTING ELECTROEROSION MACHINE

CROSS REFERENCE TO RELATED APPLICATION

This application is related to the copending application Ser. No. 60,346 filed July 25, 1979 now U.S. Pat. No. 4,321,450 as a division of Ser. No. 796,369 (U.S. Pat. No. 4,205,213). See also copending application Ser. No. 115,390 (U.S. Pat. No. 4,263,116).

FIELD OF THE INVENTION

The present invention relates generally to wire-cutting electroerosion machines and, more particularly, to an improved guide body for constituting one or, preferably, both of a pair of guide members for a continuous wire electrode axially advanced continuously to travel through a cutting zone from an inlet side to an outlet side in a wire-cutting electroerosion machine having means for applying tension to the traveling-wire electrode across the inlet and outlet sides and the guide members disposed intermediate the inlet and outlet sides for rectilinearly supporting the traveling-wire electrode therebetween and positioning the axis thereof in a machining relationship with a workpiece in the cutting zone.

BACKGROUND OF THE INVENTION

The process of wire-cutting electroerosion makes use of a continuous wire electrode of a thickness in the range between 0.05 and 0.5 mm$\phi$ which is axially advanced and transported from an inlet side through a cutting zone to an outlet side. In the cutting zone there is positioned a workpiece and a machining gap is formed between the advancing or traveling wire electrode and the workpiece. A machining liquid, typically distilled water of dielectric nature or a liquid electrolyte, is supplied to fill and flush the machining gap while an electric current, advantageously in the form of a series of pulses, is applied between the wire electrode and the workpiece to create a succession of electrical discharges or a strong electrolytic action through the fluid medium, thereby allowing material to be removed from the workpiece. As material removal proceeds, the workpiece is displaced relative to the axially traveling-wire electrode generally transversely to the axis thereof along a prescribed cutting path to form a desired cut in the workpiece.

In the path of wire travel, drive rollers driven by a motor are typically provided in the outlet side to apply a traction force to the wire electrode to feed it at a predetermined rate of advancement. Brake rollers driven by a motor may further be provided in the inlet side. Thus, the wire electrode is capable of traveling stretched under a suitable tension along the path, which should also include a pair of guide members constituted with smooth arcuate bearing surfaces designed to change the direction of wire travel from the inlet side to the cutting zone and from the latter to the outlet side, respectively. These guide members may also serve as wire-positioning guides to precisely align the traveling-wire electrode in a predetermined machining position across the workpiece in the cutting zone.

The structure of a wire-positioning guidance member therefore directly influences the machining accuracy which ensues.

Heretofore, three forms of the wire passage in the wire guidance and support assembly have been commonly in use. One makes use of a pin around which the wire electrode is carried and the second employs a V-shaped notch either rectilinear or arcuate providing a bearing surface for the traveling wire electrode. These forms tend to cause the traveling wire to come off, thereby giving rise to machining inaccuracy. The third form makes use of a die or an internal passage formed through an elongated solid member but such a structure does not allow easy mounting and dismounting of the continuous wire electrode.

OBJECT OF THE INVENTION

It is a principal object of the present invention to provide an improved guide body for constituting at least one of a pair of guide members in an electroerosion machine, which assures an improved machining accuracy while overcoming the aforementioned difficulties and inconveniences encountered with the prior art. Other specific objects will become apparent as the description below proceeds.

SUMMARY OF THE INVENTION

The present invention is directed to an improved guide body for constituting at least one of a pair of guide members for a continuous wire electrode axially advanced continuously to travel through a cutting zone from an inlet side to an outlet side in a wire-cutting electroerosion machine having means for applying tension to the traveling-wire electrode across the inlet and outlet sides and the guide members disposed intermediate the inlet and outlet sides for rectilinearly supporting the traveling-wire electrode therebetween and positioning it in a predetermined machining relationship with a workpiece in the cutting zone, which guide body comprises a first segment defining a continuous elongated wire-receiving groove having a first portion which is rectilinear and proximal to the cutting zone and a second portion which is arcuate and remote from the cutting zone, the groove being V-shaped in cross-section continuously over the first and second portions and thereby defining a pair of continuous and elongated wire-bearing surfaces joining with an angle to form the V-shaped in cross-section; and a second segment coupled to the first segment at least along the first portion for holding the wire electrode traveling through the first portion of the groove in bearing contact with the aforesaid surfaces in the first segment. In accordance with an important feature of the invention, the first segment is so formed that the groove has a length along the first portion which is at least ten times greater than the thickness or diameter of the wire electrode and preferably the second segment is held in engagement with the first segment and/or the wire electrode along at least a substantial portion of the said length.

BRIEF DESCRIPTION OF DRAWING

These and other objects, features and advantages of the present invention will become more readily apparent from the following description of certain embodiments thereof, reference being made to the accompanying drawing in which:

FIG. 1 is an elevational view in section diagrammatically illustrating an improved guide body constituting each one of a pair of guide members in a wire-cutting electroerosion arrangement according to the invention;

FIG. 2 is a cross-sectional view of the guide body taken along a plane designated by a chain dotted line represented at X—X;

FIG. 3 is a cross-sectional view of the guide body taken along a plane X'—X'; and FIG. 4 is a cross-sectional view of a modified guide body taken along X—X.

SPECIFIC DESCRIPTION

Referring now to FIG. 1, the wire-cutting electroerosion arrangement makes use of a continuous wire electrode 1 of a thickness, say, of 0.05 to 0.5 mm$\phi$ axially advanced by drive rollers (not shown) in a usual manner to continuously travel through a cutting zone 4 from an inlet side 5 to an outlet side 6. Conventional brake means (not shown) is also provided to apply tension to the traveling-wire electrode across the inlet and outlet sides 5 and 6. Intermediate the inlet and outlet sides 5 and 6 there are provided a pair of guide members 2 and 3 for rectilinearly supporting the traveling-wire electrode 1 therebetween and positioning it in a machining relationship with a workpiece 7 in the cutting zone. The workpiece is juxtaposed with the traveling-wire electrode 1 and a machining gap is defined between them. A machining liquid, typically distilled water of dielectric nature or a liquid electrolyte, is supplied to fill and flush the machining gap while an electric current, advantageously in the form of a series of pulses, is applied between the wire electrode 1 and the workpiece 7 to create a succession of electrical discharges or a strong electrolytic action through the liquid medium, thereby allowing material to be removed from workpiece 7. As material removal proceeds, the workpiece 7 is displaced relative to the axially traveling-wire electrode 1 generally transversely to the axis thereof along a prescribed cutting path to form a desired cut in the workpiece 7.

Each of the guide members 2 and 3 is constituted, in accordance with the present invention, by a guide body comprising a first segment 8 and a second segment 9. The first segment 8 is in the form of a rectangular block or column formed with a continuous and elongated wire-receiving groove 10 having a first portion B which is rectilinear and proximate to the cutting zone 4 and a second portion A which is arcuate and remote from the cutting zone 4, the first and second portions A and B of the elongate groove 10 being continuous with each other and co-planar with a plane containing the axis of the wire-electrode 1 travelling through the cutting zone 4.

The groove 10 is V-shaped in cross-section continuously over portions A and B, as apparent from cross-sectional views of the body shown in FIGS. 2 and 3 and taken along planes X—X and X'—X' in portions A and B, respectively, the planes X—X and X'—X' being both perpendicular to the axis of the wire electrode 1 traveling through the cutting zone 4. The groove 10 is V-shaped so that their two walls 10a and 10b joining with an angle 10c define a pair of continuous and elongated wire-bearing surfaces.

The second segment 9 is in the form of a rectangular plate or block and is shown in engagement with the first segment 8 for holding the wire electrode 1 traveling in the first portion B in a bearing contact with the walls 10a and 10b in the first segment 8. The tension means already noted serves to firmly hold the wire electrode traveling in the second portion A of the groove 10 in a bearing contact with the walls 10a and 10b in the first segment 8. Thus, the wire electrode 1 when traveling over the guide member 2 at the inlet side 5 is first guided through the arcuate V groove (A) or space defined by two walls 10a and 10b while being firmly held therein by the afore-noted tension means and then passed through an elongated rectilinear V groove (B) or a space defined by three surfaces, viz. two walls 10a and 10b, and plate 9, while being firmly held therein. When traveling over the guide member 3 at the outlet side 6 the wire 1 passes through the elongated rectilinear V groove B or space while being firmly held therein and then is guided over the arcuate groove A while being firmly held therein by the afore-noted tension means. In this manner, the conventional tendency for the traveling-wire electrode to come off from guide passages which are V-notched or otherwise shaped as effectively eliminated so that the axis of the wire electrode 1 traveling through the cutting zone 4 is held with an extremely high degree of precision in a machining position with the workpiece 7. In the arcuate regions A any deflection of the wire 1 is effectively removed under the tension applied by the tension means and in the rectilinear regions B the favorable position stabilization of the wire 1 is assured, giving rise to the enhanced wire-positioning and hence machining accuracy. A highly stabilized wire guiding state is thus established which is practically free from change resulting from a change of the cutting direction of the wire electrode relative to the workpiece according to a shape of the cutting path. It has been found that the wire-bearing length at rectilinear portions B in the groove 10 should be dimensioned to be at least 10 times greater than the thickness or diameter of the wire electrode 1.

Tests were conducted to compare the shape-related accuracy, the positioning accuracy and the pitch accuracy with a guide body according to the invention with those with conventional pin guides, V-notch guides and die guides. The following table shows comparison results:

|  | Shape-related Accuracy | Positioning Accuracy | Pitch Accuracy |
| --- | --- | --- | --- |
| Pin guides | bad | bad | bad |
| V-notch guides | good | excellent | fairly good |
| die guides | excellent | excellent | fairly good |
| Invention | excellent | excellent | excellent |

Advantageously, in the guide body of the invention, the segment 9 is detachably coupled to the segment 8 to permit easy mounting and dismounting of the wire electrode 1 to the guide assemblies 2 and 3.

The segment 8 may advantageously be composed of two sub-segments 8a and 8b as shown in FIGS. 2 and 3 and which may be bolted or otherwise assembled together in any known manner. FIG. 4 shows a modified form of the guide body according to the invention having a V-form groove of a uniform depth over the arcuate and rectilinear portions A and B and parallel walls 11a and 11b in the segment 8 open to the segment 9 and ajoining with the V-groove walls 10a and 10b respectively.

The segment or plate 9 may not be in an actual contact with the segment or block 8 and then should be held under elastic pressure in a pressing contact with the wire electrode 1 to hold the latter in bearing contact with the surfaces 10a and 10b along the rectilinear portion B in the groove 10.

What is claimed is:

1. A guide body for constituting at least one of a pair of guide members for a continuous wire electrode axially advanced continuously to travel through a cutting zone from an inlet side to an outlet side in a wire-cutting electroerosion machine having means for applying tension to the traveling-wire electrode across the inlet and outlet sides and the guide members disposed intermediate the inlet and outlet sides for rectilinearly supporting the traveling-wire electrode therebetween and positioning the axis thereof in a predetermined machining relationship with a workpiece in the cutting zone, the guide body comprising:

a first segment defining a continuous elongated wire-receiving groove having a first portion which is rectilinear and proximate to said cutting zone and a second portion which is arcuate and remote from said cutting zone, the groove being V-shaped in cross-section continuously over said first and second portions and thereby defining a pair of continuous and elongated wire-bearing surfaces adjoining with an angle to form a V-shaped in cross-section; and a second segment coupled to said first segment for holding said wire electrode traveling in said first portion of the groove in a bearing contact with said surfaces in said first segment.

2. The guide body defined in claim 1 wherein the wire-bearing length of said groove along said first portion is dimensioned to be at least ten times greater than the thickness in diameter of the wire electrode.

3. The guide body defined in claim 1 and claim 2 wherein said first segment comprises a pair of subsegments which are brought together to form a space with said second segment in which space said V-shaped groove is defined.

4. The guide body defined in claim 1 or claim 2 wherein said wire-bearing surfaces diverge from one another at a vertex in said first segment and in said first segment meet a wall bridging said surfaces whereby said wall and said surfaces impart a triangle shape in a cross section to said groove in said first segment.

5. The guide body defined in claim 1 or claim 2 wherein said wire in the bearing surfaces diverge from a vertex of said groove to meet mutually parallel surfaces bridged by a wall whereby said surfaces and said wall define in cross section along said first segment, a pentagon.

* * * * *